United States Patent [19]

Reiner

[11] 4,002,270
[45] Jan. 11, 1977

[54] VIBRATORY FEEDER SYSTEM

[75] Inventor: Robert Leopold Reiner, Shaker Heights, Ohio

[73] Assignee: Cleveland Machine Controls, Inc., Cleveland, Ohio

[22] Filed: May 2, 1975

[21] Appl. No.: 574,344

[52] U.S. Cl. ............................... 222/58; 222/63; 198/572

[51] Int. Cl.² ................. B65G 27/24; H02K 33/02

[58] Field of Search ............... 222/52, 55, 56, 57, 222/58, 63, 76; 198/37, 106, 76, 220 A, 220 DC; 318/39

[56] References Cited

UNITED STATES PATENTS

| | | | |
|---|---|---|---|
| 3,139,217 | 6/1964 | Mell | 222/57 |
| 3,415,417 | 12/1968 | Steel | 222/55 |
| 3,468,456 | 9/1969 | Cline | 222/55 |
| 3,748,553 | 7/1973 | Reiner | 198/220 DC X |
| 3,786,961 | 1/1974 | Wahl et al. | 222/55 |

*Primary Examiner*—Robert B. Reeves
*Assistant Examiner*—Joseph J. Rolla

[57] ABSTRACT

A vibratory feeder system is disclosed which employs control circuitry for controlling one or a plurality of vibratory feeders such that product is discharged at a constant weight per unit time. This is preferably achieved by deriving a weight analog representative of product weight and then using this information for controlling product velocity as by modulating the tray velocity or varying the flow of product from a supply source to the tray.

17 Claims, 5 Drawing Figures

VIBRATORY FEEDER SYSTEM

This invention relates to the art of vibratory feeders and, more particularly, to improvements in control circuitry for driving one or more vibratory feeders so that product is discharged at a desired product weight per unit time.

The invention is particularly applicable for use in conjunction with controlling conveyance of bulk material from a supply source, such as a hopper, to a material utilization station such that the product is delivered at a constant product weight per unit time.

Material conveyance systems are known in the art wherein the objective is to achieve delivery of product at a controlled or constant product weight per unit time. However, such known systems typically employ components which are difficult to interface, such as motor driven conveyor belts, pneumatic or load cell weight transmitters, solenoid operated hopper gates as well as sophisticated digital control circuitry.

It is an object of the present invention to provide an improved system for controlling one or more vibratory feeders to obtain control of the delivery of product at a desired level of weight per unit time and with relatively inexpensive, easy to interface components relative to that known hereinbefore.

It is still a further object of the present invention to provide control of a single vibratory feeder wherein product weight is electrically determined without mechanical weigh scales and then the tray velocity is adjusted to attain a desired discharge rate of product weight per unit time.

It is a still further object of the present invention to control at least two vibratory feeders arranged in tandem such that product is conveyed from one feeder to the other and then discharged at a constant weight per unit time wherein the product weight in the second tray, operating at a fixed tray velocity, is determined for use in modulating the tray velocity of the first tray.

In accordance with one aspect of the present invention the system includes a vibratory feeder having a tray for receiving product to be conveyed along and then discharged therefrom. A driver unit serves to impart reciprocal vibratory motion to the tray to convey product and includes electromagnetic driver means coupled to the tray for imparting drive forces thereto in order to achieve tray velocity. A driver control for controlling the driver unit includes circuitry for providing drive current to the driver to provide drive forces in proportion to the magnitude of the drive current and for providing a tray velocity signal having a magnitude dependent upon the tray velocity and for varying the magnitude of the drive current in dependence upon the value of the velocity signal relative to the value of a velocity reference signal. A product density control serves to control the rate of discharge of product from the tray. This includes means for providing a product weight signal representative of the weight of the product in the tray as a function of the magnitude of the drive current together with means for varying the velocity reference signal dependent upon the magnitude of the product weight signal.

In accordance with another aspect of the present invention the vibratory feeder system employs first and second vibratory feeders arranged in tandem with each feeder including a tray such that the tray of the first feeder serves as a feed tray and is arranged to receive product from the supply source to be conveyed along the feed tray and then discharged therefrom into the second tray. The second tray serves as a weigh tray for receiving product from the first tray and conveying product along the weigh tray and discharging product therefrom. First and second driver units serve to respectively impart reciprocal vibratory motion to the feed tray and to the weigh tray to convey product. Each driver unit includes electrodynamic driver means coupled to its associated tray for imparting drive forces thereto to achieve tray velocity. First and second driver control means serve to respectively control the first and second driver units. Each driver control means includes circuit means for applying drive current to its associated driver means to provide the drive forces in proportion to the magnitude of the drive current. A tray velocity signal is provided having a magnitude dependent on the tray velocity. The magnitude of the drive current may be varied in dependence upon any difference between the velocity signal and a velocity reference signal so as to thereby adjust the tray velocity. A product density control serves to control the discharge rate of product from the weigh tray to obtain relatively constant discharge of product weight per unit time from the weigh tray. This control includes means for providing a product weight signal representative of the weight of product in the weigh tray as a function of the magnitude of the drive current applied to the second driver. The velocity reference signal for the second vibratory feeder may be varied in dependence upon the magnitude of the product weight signal. A product velocity signal is provided which is representative of the velocity of product conveyed in the weigh tray as a function of the magnitude of the tray velocity signal for the second feeder. The velocity reference signal for the first vibratory feeder may be varied in dependence upon the magnitude of the product velocity signal so as to thereby achieve constant discharge of product in weight per unit time.

DESCRIPTION OF PREFERRED EMBODIMENTS

The foregoing and other objects and advantages of the invention will become more readily apparent from the description of the preferred embodiments of the invention as taken in conjunction with the accompanying drawings which are a part hereof and wherein.

Figure 1:
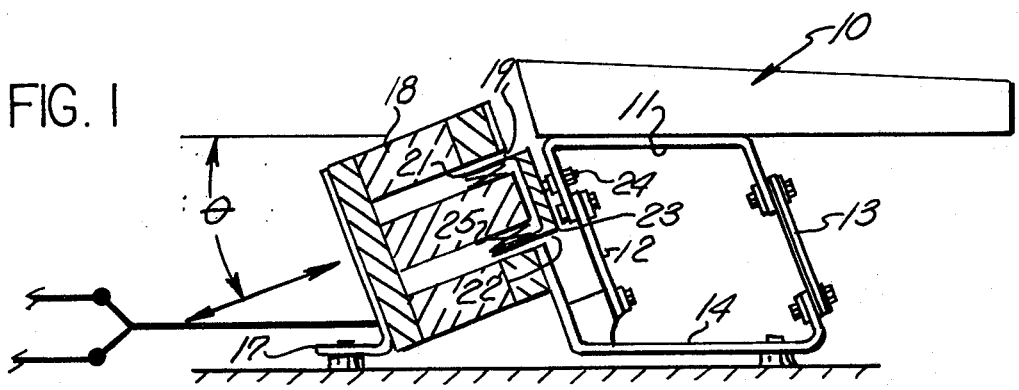
FIG. 1 is a diagrammatic longitudinal sectional view of a vibratory feeder tray and a driver unit therefor and which may be employed in practicing the present invention.
Figure 2:
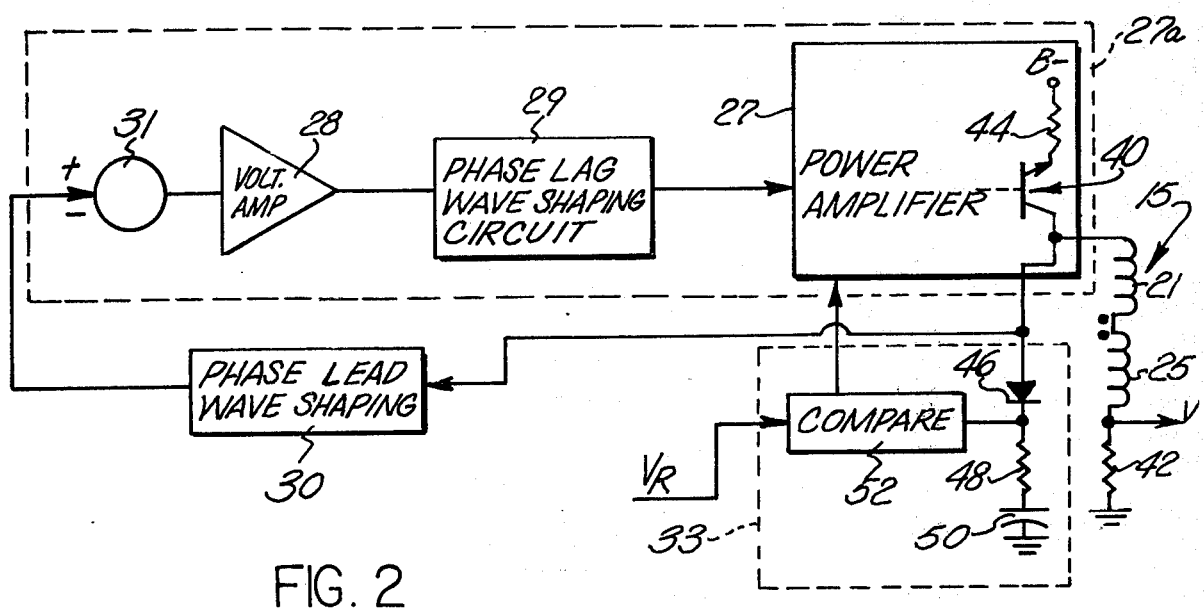
FIG. 2 is a combined schematic-block diagram illustration of a vibratory unit control circuit which may be employed in practicing the present invention.

Referring now to the drawings, wherein the showings are for purposes of illustrating preferred embodiments of the invention only and not for purposes of limiting same, FIGS. 1 and 2 provide illustrations of a vibratory tray, an electromagnetic driver and a driver control circuit all of which may be employed in practicing the present invention. The feeder tray and the electromagnetic driver illustrated in FIG. 1 as well as the driver control circuit illustrated in FIG. 2 preferably take the form as illustrated and described in my previous U.S. Pat. No. 3,748,553 and which illustrations and descriptions are hereby incorporated by reference. Whereas the following description is given with respect to FIGS. 1 and 2 in order to provide a complete understanding of the present invention, attention is directed to the aforesaid patent for a detailed description of the vibratory tray, electrodynamic driver and the driver control circuit. In FIG. 1 the vibratory feeder is disclosed as including a tray 10 together with an electrodynamic driver 15. The tray 10 may be constructed of suitable materials, such as aluminum, and have a suitable cross-section, rectangular or circular or the like. The tray is secured by any suitable means to a bracket or support 11, which, in turn, is mounted by flexures 12 and 13 on a base member 14. The base member 14 is joined to the field structure of the electromagnetic driver 15 which has its bottom plate 16 secured to another base member 17. A cylindrical magnet 18 provides a magnetic field across an angular air gap 19 formed between an outer pole piece and a radially inner core piece 20. A driving coil 21 is mounted in any suitable manner for reciprocation in the air gap 19. The coil 21 is shown suspended at the lower end of the cylindrical skirt portion 22 of an armature member 23 which is coupled by a bolt 24 to the bracket 11 for imparting vibratory motion thereto. A stationary compensating coil 25 is located in the air gap 19 concentrically related to the driving coil 21. The coil 25 is wound directly on the inner core piece 20. The compensating coil 25 has substantially the same number of turns and is of substantially the same size conductor and of the same pitch as the driving coil 21 so that the inductance of the compensating coil is approximately the same as the inductance of the driving coil.

The field structure illustrated in the drawing is a preferred arrangement although it may be modified as desired by those skilled in the art. Whereas a permanent magnet is employed in the preferred embodiment, a magnetic field produced by a DC power source may also be employed. The flexures 12 and 13 may take any well known form.

The driver control circuit for driving the electromagnetic driver and, hence, the vibratory tray preferably takes the form as illustrated in FIG. 2. Basically, this control circuit, which is described in greater detail in U.S. Pat. No. 3,748,553, supplies uni-directional current pulses to the driving coil 21 at a frequency of oscillation determined by the mechanical resonant frequency of the driver coil, the spring system, the tray and any load carried on the tray. The current pulses exhibit an amplitude in accordance with the desired tray velocity, as measured in terms of the tray displacement during each driving stroke. This control circuit includes a self-excited oscillation loop circuit 27A, shown in dotted lines in FIG. 2. This circuit is comprised of a power amplifier 27 which receives its input signal from a high gain voltage amplifier 28 after the input signal is passed through a phase lag wave shaping circuit 29. A regenerative feedback path is provided from the electromechanical driver 15 through a phase lead wave shaping circuit 30 to a summation point 31 which feeds the input of the voltage amplifier 28. The closed loop circuit including the electromechanical driver 15 provides for self-excited oscillation as is described in U.S. Pat. No. 3,748,553. Frequency of oscillation is determined by the mechanical resonant frequency of the combined resonant mechanical system including the driving coil air, the spring flexures 12 and 13, the tray 10, and any load carried by the tray. A velocity servo circuit 33 provides a gain control function regulating the gain of the power amplifier 27 as a function of the velocity of the driver 15 in order to maintain such velocity at constant level.

During operation, the power amplifier 27 periodically provides current pulses to energize the driving coil 21 at the resonant frequency. To accomplish this, the power amplifier 27 includes in its last stage a switching device in the form of NPN transistor 40 having its collector connected in series with windings 21 and 25. These windings are connected in series opposition as is indicated by the polarity dots in FIG. 2. Consequently then, when the transistor 40 is conductive current will flow from ground through a resistor 42 and then through windings 25, 21 and through the collector to emitter electrodes of the transistor 40 and through a resistor 44 to a B− voltage source. The current flow through the windings 21 and 24 causes the moving element of the driver 15 to be displaced against the resistance of the spring flexures. As movement slows, upon the moving element approaching the end of its limit of travel, the back e.m.f. developed by winding 21 will decrease causing the voltage at the junction of winding 21 and the collector of transistor 40 to move toward ground potential. This potential is reflected through the phase lead circuit 30 to the positive input of amplifier 28 causing a reversal in condition of the amplifier; that is, the ground potential going signal will cause the output to shift from that nearest the negative potential towards the potential at ground. This shift in output from amplifier 28 passes through the shaping circuit 29, being delayed somewhat in phase, and causes transistor 40 to be cut off. However, the stored energy in the flexures associated with the resonant mechanical system causes the moving element including driving coil 21 to return toward its original position. A voltage is now developed between ground and the junction of winding 21 and the collector of transistor 40 of a polarity opposite to that initially applied to the winding. This voltage will have a peak magnitude dependent upon the flyback velocity of the moving coil 21. Preferably a comparison of this flyback velocity with a voltage $V_r$, as a set point of desired velocity is made within the velocity servo circuit 33. This may be accomplished by applying a current derived from this voltage through a diode 46 and thence through a resistor 48 to charge a capacitor 50. The peak value, as measured between ground and the junction of resistor 48 and diode 46, is compared against the velocity reference $V_r$ by means of a conventional comparator circuit 52. The difference or error signal is then employed in a conventional manner to adjust the gain of the power amplifier 27 in a direction tending to reduce the error signal to zero. The velocity may be adjusted by varying the value of the reference signal $V_r$.

The vibratory feeder control circuit serves to provide control such that the vibrating frequency of tray 10 is maintained at the resonant frequency and the tray velocity is maintained in accordance with the level of the velocity reference $V_r$.

In accordance with the present invention, as will be described in greater detail hereinafter with respect to the embodiments of FIGS. 3, 4, and 5, utilization is made of the control unit illustrated in FIG. 2 in controlling the operation of a vibratory feeder, such as that shown in FIG. 1, so as to maintain the discharged product at a constant weight per unit time. As will be brought out in greater detail hereinafter, this is achieved by utilizing the driver current pulses to the driving coil 21 (FIG. 2) to obtain a measure of product weight in the tray being driven by that control unit. Having established the product weight in the driven tray, control is exerted by varying the velocity of that tray or of an upstream feeder to achieve control of discharged product weight per unit time.

Figure 3:
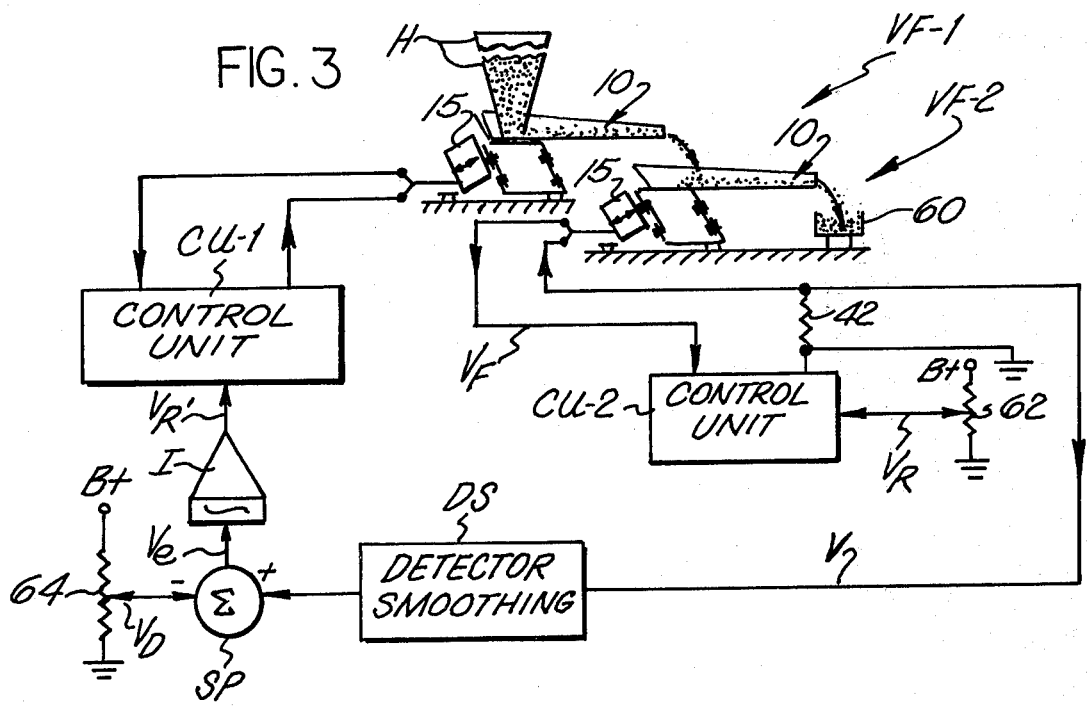
FIG. 3 is a combined schematic-block diagram illustration of one embodiment of the invention employing, in tandem, a vibratory feed tray and a vibratory weigh tray.

The embodiment of the invention illustrated in FIG. 3 employs two vibratory feeders in a tandem arrangement. These may be referred to as vibratory feeders VF-1 and VF-2 with feeder VF-1 being considered as the upstream feeder including a feeder tray for receiving product, such as sticky powders and the like, from a hopper H. The downstream feeder VF-2 includes a tray positioned to receive product from the exit end of the tray in feeder VF-1. Feeder VF-2 may be considered as a weigh feeder and incorporates a weigh tray. Each of the feeders, VF-1 and VF-2, is preferably constructed as described in detail hereinbefore with reference to FIG. 1 and, hence, includes a tray 10 and a driver 15. The hopper H is preferably suspended from above such that a vertical load of product is supported by the feeder tray. In this embodiment, the product discharged from the weigh tray 10 of feeder VF-2 into a receiving unit, such as bin 60, is controlled so that the discharged product exits from the weigh tray having constant weight per unit time. This is accomplished by sensing the product weight in the weigh tray as a function of the value of the current drive pulses as supplied to the driver unit 15 thereof and then utilizing the derived signal as an analog of product weight and comparing it against a reference signal to control the tray velocity of the feeder tray in feeder VF-1.

The driver 15 of the feeder VF-1 is controlled by a vibratory control unit CU-1 and, similarly, the driver 15 of feeder VF-2 is controlled by a control unit CU-2. Each of these control units, CU-1 and CU-2, corresponds with the control circuitry illustrated in FIG. 2 herein. As was brought out hereinbefore such a control unit serves to drive its associated tray at a frequency corresponding with the mechanical resonant frequency of the driver and tray in combination with any load on the tray. As will be recalled from the discussion with reference to FIG. 2, the tray velocity is proportional to the back e.m.f. developed across the moving coil 21. The peak value of this signal is measured and applied to the comparator circuit 52 (see FIG. 2) for purposes of varying the gain of the power amplifier and, hence, the magnitude of the current pulses applied to the driving coil. As the product weight is increased the control unit will cause the magnitude of the current pulses to be increased and vice versa. Consequently then, the magnitude of the current pulses is related to the product weight in the tray being controlled. As will be brought out in greater detail with reference to the embodiments of FIGS. 4 and 5, the magnitude of the current applied to the driving coil includes a component which is related directly to product weight and a component which is related to certain losses involved. These losses will be neglected in the following discussion given with reference to the embodiment of FIG. 3.

Referring now to the embodiment of FIG. 3, the velocity of the product flowing from the feed tray 10 of the feeder VF-1 is modulated to hold the weight of the product in the weigh tray of feeder VF-2 constant. It is seen that if the product area in the weigh tray is constant and the weight of the product held in that tray is also held constant then the material being discharged will have a constant weight per unit time if the tray velocity is held constant.

The weight analog is the current applied by control unit CU-2 through a low resistance dropping resistor 42 to the driving coil 21 of the driver 15 in feeder VF-2. The tray velocity is held constant since the control unit CU-2 compares the flyback voltage $V_f$ with the velocity set point voltage $V_r$ taken from a potentiometer 62. With the tray velocity being held constant by the control unit CU-2, the voltage V developed across the resistor 42 is a series of uni-directional pulses having a magnitude which varies in accordance with the product weight in the weigh tray of feeder VF-2. These pulses may be smoothed or may be peak or RMS detected and then compared against a reference. In the embodiment illustrated, the pulses are smoothed by a detector smoothing circuit DS and applied as a DC signal to a summing point SP with the signal exhibiting a magnitude proportional to the product weight. The weight analog signal, as smoothed by the detector smoothing circuit, is compared at the summing point with a density (constant weight) set point signal $V_d$ obtained from a potentiometer 64. The difference or error signal is $V_e$ applied through an integrator I to develop a velocity control signal $V_r$ which is applied to the control unit CU-1 to thereby adjust the velocity of the feeder tray of feeder VF-1 so as to drive the error signal $V_e$ to zero. Whereas an integrator I is employed as the coupling element between the summing point SP and the control unit CU-1, simple amplification may suffice in various applications. However, the use of an integrator provides an ideal coupling to minimize drift as well as to simplify matching of signal levels between the error signal and the velocity input to the control unit CU-1.

From the foregoing it is seen that the discharged product weight per unit time from the weigh feeder VF-2 is held constant by maintaining the tray velocity of that feeder constant while varying the tray velocity of feeder VF-1 in accordance with any variations in the magnitude of the current pulses applied by control unit CU-2 to the driver of feeder VF-2.

In the embodiment of FIG. 3 two vibratory feeders are utilized in tandem. This embodiment may be modified somewhat by employing a different feeder such as a belt conveyor or a variable displacement hopper door or a product gating device. In such case, the product weight analog signal would be employed to control the flow of product from such a feeder to the tray of the vibratory feeder VF-2. Moreover, the accuracy of the embodiment of FIG. 3 may be increased by employing a second weigh tray. In such a version the first weigh tray (i.e. the tray of feeder VF-2) would serve as the feed tray output for the second weigh tray. The smoothed feedback signal of the second weigh tray system would then serve as the density set point for the control system. Such a double weigh system would provide improved accuracy of control.

Figure 4:
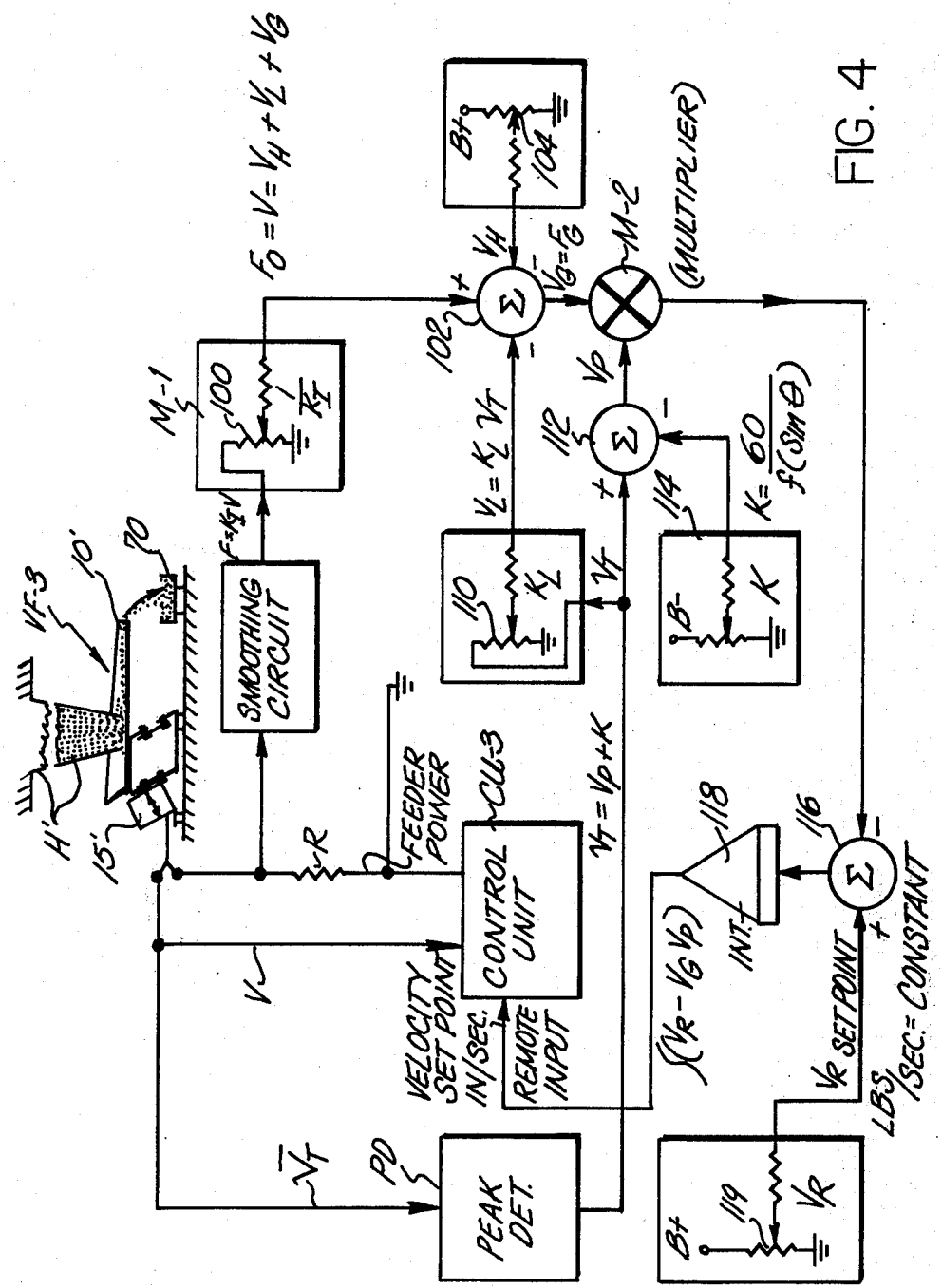
FIG. 4 is a combined schematic-block diagram illustration of a second embodiment of the invention employing a single vibratory tray together with control circuitry.

Reference is now made to the embodiment of the invention as illustrated in FIG. 4. In this embodiment, a single vibratory feeder VF-3 is controlled so that the product discharged from the tray 10 to a receiving bin 70 exhibits a constant weight per unit time. The vibratory feeder VF-3 is constructed in the same manner as described hereinbefore with respect to FIG. 1. Consequently, the feeder includes a tray 10 for receiving product from a hopper with the hopper being suspended from above so that only a portion of the product within the hopper acts as a vertical load on the tray. A driver 15 for the tray is controlled by a vibratory control unit CU-3, constructed in the same manner as that described hereinbefore with respect to FIG. 2. In this embodiment the tray velocity is varied when the product weight as multiplied by the product velocity differs from a set point level. Before describing the operation of the embodiment of FIG. 4 attention is first directed to certain factors which should be considered. This includes the hopper load, the flexure or spring loss and product velocity. These are separately discussed below.

The hopper load is the weight of the product in the hopper H which is supported by the tray. Power is required to lift and slide (sheering effort) to convey material from under the hopper. Material levels, above a determinable level, are substantially isolated from affecting the conditions at the discharge point. This occurs as a result of material "bridging" in the hopper. A hopper design which encourages "bridging" will tend to increase system accuracy.

Product velocity is not directly measured. The system as described herein controls or modulates tray velocity. The product velocity deviates from tray velocity because of slip and gravity. With respect to slip, a lower frequency of operation can reduce the peak product acceleration so that reaction forces will drop below that required to overcome friction. Conveying of product can only occur when the product becomes airborne. With respect to gravity, there is a constant vertical acceleration component which is identically equal and opposite to the acceleration of gravity. This affects the forward or horizontal product velocity by a factor relative to the tangent of the drive angle.

The third factor involved in this consideration deals with spring losses. As the tray displacement changes, the no-load input force will change to overcome the changing spring losses.

With the foregoing factors in mind, the following is a presentation of equations dealing with product velocity and force allocation. After the discussion of the equations, attention will be directed to the implementation as presented with respect to the embodiment in FIG. 4. These equations are:

1. Product Velocity $$V_p = v_T - \frac{60}{f(\sin \theta)} \quad \begin{matrix} D_T < T_D \\ D_T = T_D \end{matrix} \quad (1)$$

and:

$$V_{pt} = \pi f\, T_D + (D_T - T_D) - \frac{60}{f(\sin \theta)} \quad \begin{matrix} D_T > T_D \\ D_T = T_D \end{matrix}$$

and:

$$T_D = \frac{384}{2\pi f^2 (\sin \theta)} \quad (2)$$

$V_p$ = Product Velocity ($v$)
$V_T$ = Tray Velocity
$\theta$ = Tray drive angle (relative to the flexure spring base)
$f$ = Operating Frequency
$D_T$ = Tray amplitude (peak to peak inches)
$T_D$ = Displacement producing turbulant material flow
$V_{pt}$ = Turbulant flow product velocity NOTE: Tray velocity is defined as:

$$V_T = \pi f D_T \quad (3)$$

where:
$V_T$ = Tangential velocity around a circle of diameter $D_T$ with angular velocity of omega. Also identified as tray velocity.

2. Force Allocation

The driver unit in the Gravimetric system lifts and conveys product from current supplied to the moving force coil. The well known relationship is:

$$F = BIL \quad (4)$$

where:
B and L are constant
I = input current
When current is sensed through a series dropping resistor, $$I = GV \quad (5)$$

The total current I is a composite of components relative to forces needed to sustain the following:
$F_H$ = Hopper load
$F_L$ = Flexure (spring) loss
$F_G$ = Gravimetric force needed to sustain product,
where:
$$F_G = \text{lbs/in } f = \text{const} \quad (6)$$
and $F_G$ is considered a force gradient, having units of in 3/in or lbs/in relative to product density.
combining equation (4) and (5) and assigning a constant of proportionality $K_I$
Then:

$$F = K_I V \quad (7)$$

and:

$$F = F_H + F_L = F_G$$

$$V = V_H + V_L + V_G$$

The desired function to be synthesized by the servo is:

$$V_G \times V_P = \frac{\text{lbs}}{\text{in}} \times \frac{\text{in}}{\text{sec}} = \frac{\text{lbs}}{\text{sec}} = \text{constant} \quad (8)$$

Referring to equation (1), it can be simplified as follows:

$$V_P = V_T - k$$

where:

$$k = \frac{60}{f(\sin \theta)} \qquad (9)$$

Both the frequency of oscillation $f$ and the angle of drive $\theta$ are sufficiently constant. Certainly, a correction for frequency drift could also be made. It is a detail that does not add to forwarding the basic concepts.

Experiment confirms that to a first order approximation:

$$F_L \text{ (spring loss)} = K_S D_T \qquad (10)$$

where:

$K_S$ is the spring loss factor
$D_T$ = Spring displacement
Also, by substituting $V_T$ for $D_T$ from equation (3)

$$F_L = K_L V_T \qquad (11)$$

where:

$K_L$ is a constant including $\pi$, $f$ and $K_S$.

A physical implementation of equations 1 through 11 is presented by the embodiment illustrated in FIG. 4. In this embodiment, an analog solution is presented which, in effect, compares equation 8 with a control variable $V_r$. This is the set point as to desired rate of flow of product weight in terms of pounds per second. Any error is applied as the velocity set point for the vibratory control unit CU-3 which then modulates the tray velocity to compensate for product density variations from the set point.

Referring now to FIG. 4, the control unit CU-3 supplies driving current pulses to the driving coil 21 of the feeder VF-3 through a low resistance dropping resistor R (corresponding with resistor 42 in FIG. 3). A signal is developed across this resistor which is then smoothed by a smoothing circuit SC to develop a signal F (moving force), where $F = K_I V$. This signal is then supplied to a passive multiplying circuit M-1 which serves to multiply the signal by a factor of $1/K_I$. This may be accomplished by applying the signal from the smoothing circuit across the resistor portion of a potentiometer 100 having a wiper arm set so that the output signal from the wiper arm is equal to $F_o$, where $F_o = V$. The signal V is composed of three components $V_H$, $V_L$, and $V_G$ as discussed hereinbefore with reference to equation 7.

The signal V is applied to the positive input of a summing point 102. Other inputs are applied to summing point 102 representative of the hopper load signal $V_H$ and the spring loss signal $V_L$ so that the output signal $V_G$ taken from the summing point is representative of the gravimetric force $F_G$ required to sustain product. A signal representative of the hopper load $V_H$ is supplied from a potentiometer 104 having its wiper arm adjusted to provide a signal having a magnitude which simulates the hopper load which, as defined hereinbefore, is the vertical load of product supported by the tray.

The summing point 102 also serves to subtract a signal representative of the spring or flexure loss. Consequently, a signal $V_L$ is supplied to a negative input of the summing junction 102 with the signal $V_L = K_L V_T$ in accordance with equation 11. This signal is obtained from the wiper arm of a potentiometer 110 wherein the wiper arm is adjusted to provide a multiplying factor in accordance with the constant $K_L$. A signal $V_T$ having a magnitude in accordance with the peak velocity of tray 10 of feeder VF-3 is applied across the resistance portion of the potentiometer.

As will be recalled from the discussion with reference to FIG. 2, the peak value of the back e.m.f. or the flyback voltage is used as a measure of tray velocity. This back e.m.f. is supplied to the control unit CU-3 for purposes of controlling the magnitude of the drive current pulses applied through resistor R to the driving coil. In addition, a parallel path is shown in FIG. 4 with the flyback voltage being supplied to a peak detector circuit PD which serves to provide a steady-state output signal $V_T$ having a magnitude in accordance with the tray velocity. The peak detector PD may take any suitable form, such as the peak detector illustrated in FIG. 2 including a diode-capacitor network. If desired, the peak detector circuit PD illustrated in FIG. 4 may be eliminated and, instead, the signal $V_T$ may be obtained from the peak detector within the control unit CU-3 (i.e. between the junction of diode 46 and resistor 48 in the circuit of FIG. 2).

From FIG. 4 it is seen that the output signal $V_G$ taken from the summing point 102 is now representative of the gravimetric force required to sustain product. This signal is supplied to one input of a conventional multiplier circuit M-2 which serves to multiply the force signal $F_G$ (equal to signal $V_G$) by a signal $V_P$ representative of the product velocity. As was brought out hereinbefore with reference equation 9, product velocity $V_P = V_T - K$. The tray velocity signal $V_T$ is therefore applied to one input of a summing point 112. A signal K representative of the constant K in equation 9 is applied to the negative input of the summing point and is supplied from the wiper arm of a potentiometer 114. The output from the summing point is a signal $V_P$ representative of the product velocity. This is multiplied by the force gradient signal $F_G$ with the output signal being supplied to the negative input of another summing point 116. This summing point compares the product of the force gradient $F_G$ and the velocity $V_P$ with a set point reference signal $V_R$ representative of the desired level in pounds per second of product being discharged from the tray. This reference signal is obtained from a wiper arm of a potentiometer 119 with the wiper arm being adjusted in accordance with the desired set point level. The difference or error signal obtained from the summing point 116 is applied through an integrating circuit 118 with the output signal then being supplied as a velocity set point signal to the control unit CU-3 in the same manner as the velocity set point signal was supplied to the control unit CU-1 in the discussion hereinbefore with reference to FIG. 3. The control unit CU-3 will then adjust or modulate the tray velocity in dependence upon the magnitude of the error signal so as to reduce the error signal to zero.

Figure 5:
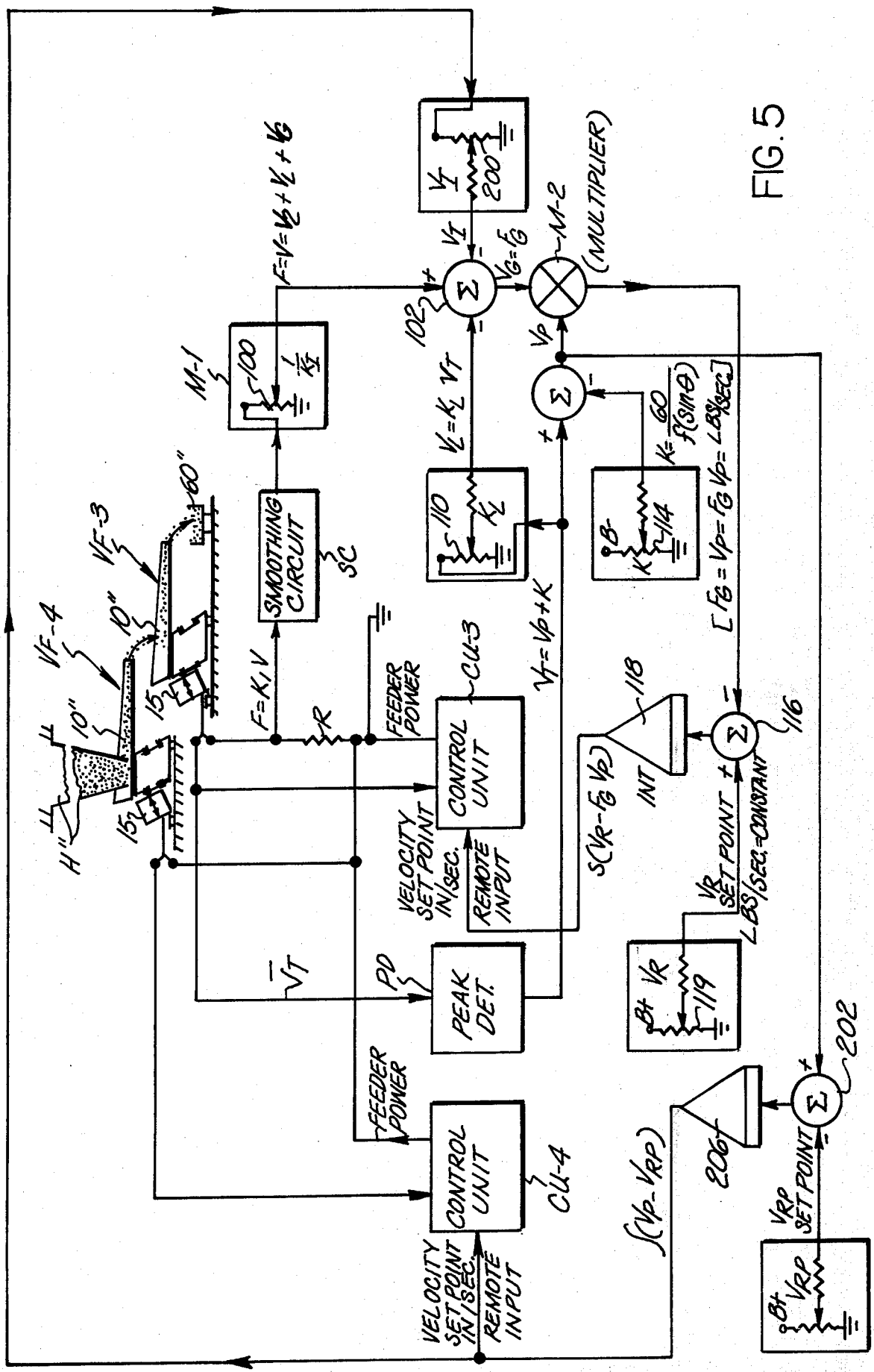
FIG. 5 is a combined schematic-block diagram illustration of a third embodiment of the invention employing a vibratory feed tray and a vibratory weigh tray together with control circuitry similar to that illustrated in FIG. 4.

Attention is now directed to the embodiment illustrated in FIG. 5. This embodiment, while employing two vibratory feeders in tandem as in the case of the embodiment of FIG. 3, incorporates control circuitry substantially identical to that of the single vibratory feeder embodiment of FIG. 4. Consequently then, for purposes of facilitating an understanding of the invention, like components in FIGS. 4 and 5 are identified with like character references and only the differences in he embodiment of FIG. 5 will be described hereinafter in detail.

The embodiment of FIG. 5 employs a vibratory feeder VF-3 together with control circuitry substantially identical to that illustrated in embodiment of FIG. 4. An exception, however, is that in the embodiment of FIG. 5 a signal $V_I$ is supplied to one of the negative inputs of the summing point 102 and is taken from a potentiometer 200. This replaces the potentiometer 104 of FIG. 4. The signal $V_I$ is representative of a component to be subtracted in deriving the force gradient with the component being representative of the impact error as product drops into the weigh pan. Also, in this embodiment vibratory feeder VF-3 serves as a weigh scale unit with its tray receiving product from a feed tray in a vibratory feeder VF-4. This feeder in a manner similar to that embodiment of FIG. 3 includes a control unit CU-4 identical to control unit CU-3. Product is supplied to the feeder tray from a hopper H suspended from above. In addition, the product velocity signal $V_T$ obtained from the summing point 112 in this embodiment is also supplied to the positive input of a summing point 202 for comparison with a set point signal $V_{RP}$. This set point signal is representative of a desired product velocity and is obtained from the wiper arm of a potentiometer 204. Any error signal obtained from the output of the summing point 202 is integrated by an integrator 206 with the output of the integrator being employed as velocity set point input to the control unit CU-4. This signal is also supplied as the input to the resistance portion of potentiometer 200 for purposes of deriving signal $V_I$ for correcting for impact error. Consequently then, the embodiment of FIG. 5 provides a control loop which holds the product velocity at a nominal preset value. The inner gravimetric loop corrects the instantaneous velocity to hold delivery rate or weight per second at the discharge end of the weigh tray more constant than that of the embodiment illustrated in FIG. 4. This is achieved by substantially reducing the effects of transit time across the weigh tray.

Although the invention has been described in conjunction with preferred embodiments, it is to be appreciated that the invention is not limited to same as various modifications and arrangements may be made without departing from the spirit and the scope of the invention as defined by the appended claims.

What is claimed is:

1. A vibratory feeder system comprising:
    a vibratory feeder including a tray for receiving product to be conveyed along and then discharged therefrom,
    a driver unit for imparting reciprocal vibratory motion to said tray to convey product including electromagnetic driver means coupled to said tray for imparting drive forces thereto to achieve tray velocity,
    driver control means for controlling said driver unit and including circuit means for applying drive current to said driver means to provide said drive forces in proportion to the magnitude of said drive current and means for providing a tray velocity signal having a magnitude dependent upon said tray velocity and means for varying the magnitude of said drive current in dependence upon the value of a velocity reference signal to thereby adjust the tray velocity; and,
    product density control means for controlling the rate of discharge of product from said tray and including means for providing a product weight signal representative of the weight of the product in said tray as a function of the magnitude of said drive current, and means for varying said velocity reference signal dependent upon the magnitude of said product weight signal.

2. A vibratory feeder system as set forth in claim 1, wherein said means for providing said product weight signal includes means responsive to said drive current for providing a first signal exhibiting a magnitude which varies in dependence upon the magnitude of said drive current.

3. A vibratory feeder system comprising:
    a vibratory feeder including a tray for receiving product to be conveyed along and then discharged therefrom,
    a driver unit for imparting reciprocal vibratory motion to said tray to convey product including electromagnetic driver means coupled to said tray for imparting drive forces thereto to achieve tray velocity,
    driver control means for controlling said driver unit and including circuit means for applying drive current to said driver means to provide said drive forces in proportion to the magnitude of said drive current and means for providing a tray velocity signal having a magnitude dependent upon said tray velocity and means for varying the magnitude of said drive current in dependence upon the value of a velocity reference signal to thereby adjust the tray velocity,
    product density control means for controlling the rate of discharge of product from said tray and including means for providing a product weight signal representative of the weight of the product in said tray as a function of the magnitude of said drive current, means for varying said velocity reference signal dependent upon the magnitude of said product weight signal, said means for providing said product weight signal includes means responsive to said drive current for providing a first signal exhibiting a magnitude which varies in dependence upon the magnitude of said drive current, said responsive means includes a resistor.

4. A vibratory feeder system comprising:
    a vibratory feeder including a tray for receiving product to be conveyed along and then discharged therefrom,
    a driver unit for imparting reciprocal vibratory motion to said tray to convey product including electromagnetic driver means coupled to said tray for imparting drive forces thereto to achieve tray velocity,
    driver control means for controlling said driver unit and including circuit means for applying drive current to said driver means to provide said drive forces in proportion to the magnitude of said drive current and means for providing a tray velocity signal having a magnitude dependent upon said tray velocity and means for varying the magnitude of said drive current in dependence upon the value of a velocity reference signal to thereby adjust the tray velocity,
    product density control means for controlling the rate of discharge of product from said tray and including means for providing a product weight signal representative of the weight of the product in said tray as a function of the magnitude of said drive current, means for varying said velocity reference signal dependent upon the magnitude of said product weight signal, said means for providing said product weight signal includes means responsive to said drive current for providing a first signal exhibiting a magnitude which varies in dependence upon the magnitude of said drive current, means for developing a said product weight signal from said first signal such that the product weight signal is reduced in value from that of said first signal to compensate for mechanical losses.

5. A vibratory feeder system as set forth in claim 4 including compensating means for providing a loss signal representative of said mechanical loss and means for subtracting said loss signal from said first signal to provide said product weight signal.

6. A vibratory feeder system as set forth in claim 4 including means for providing a product velocity signal having a magnitude representative of product velocity as a function of said tray velocity signal, and means for multiplying said product velocity signal with said product weight signal to provide a resultant signal representative of the multiplication of product weight and product velocity.

7. A vibratory feeder system as set forth in claim 6 wherein said means for providing said velocity reference signal includes means for adjusting said velocity reference signal in dependence upon the value of said resultant signal.

8. A vibratory feeder system as set forth in claim 7 including controllable product supplying means for supplying product to said tray at a controllable product flow rate;

and circuit means responsive to said product velocity signal for controlling said product supply means to vary the flow of product into said tray in dependence upon any difference between said product velocity signal and a product velocity reference signal.

9. A vibratory feeder system comprising:
a vibratory feeder including a tray for receiving product to be conveyed along and then discharged therefrom,
a driver unit for imparting reciprocal vibratory motion to said tray to convey product including electromagnetic driver means coupled to said tray for imparting drive forces thereto to achieve tray velocity,
driver control means for controlling said driver unit and including circuit means for applying drive current to said driver means to provide said drive forces in proportion to the magnitude of said drive current and means for providing a tray velocity signal having a magnitude dependent upon said tray velocity and means for varying the magnitude of said drive current in dependence upon the value of a velocity reference signal to thereby adjust the tray velocity,
product density control means for controlling the rate of discharge of product from said tray and including means for providing a product weight signal representative of the weight of the product in said tray as a function of the magnitude of said drive current, means for varying said velocity reference signal dependent upon the magnitude of said product weight signal, means for providing a product velocity signal representative of the velocity of product conveyed along said tray in dependence upon the magnitude of said tray velocity signal, and wherein said means for varying the velocity reference signal serves to vary the velocity reference signal in dependence upon the magnitude of both said product velocity signal and said product weight signal.

10. A vibratory feeder system comprising:
first and second vibratory feeders arranged in tandem and each including a tray with the tray of said first feeder serving as a feed tray and being arranged to receive product from a supply source to be conveyed along said feed tray and then discharged therefrom into the tray of said second feeder, serving as a weigh tray, for receiving and conveying product along said weigh tray and then discharging product therefrom;
first and second driver units for respectively imparting reciprocal vibratory motion to said feed tray and to said weigh tray to convey product, each said driver unit including electromagnetic driver means coupled to its associated tray for imparting driver forces thereto to achieve tray velocity;
first and second driver control means for controlling said first and second driver units, each said driver control means including circuit means for applying drive current to its associated driver means to provide said drive forces in proportion to the magnitude of said drive current and means for providing a tray velocity signal having a magnitude dependent on said tray velocity and means for varying the magnitude of said drive current in dependence upon any difference between said velocity signal and a velocity reference signal to thereby adjust the tray velocity; and,
product density control means for controlling the discharge rate of product from said weigh tray to obtain relatively constant discharge of product weight per unit time from said weight tray and including means for providing a product weight signal representative of the weight of product in said weigh tray as a function of the magnitude of the drive current applied to said second driver means, means for varying the velocity reference signal for said second vibratory feeder dependent upon the magnitude of said product weight signal, means for providing a product velocity signal representative of the velocity of product conveyed in said weigh tray as a function of the magnitude of said tray velocity signal for said second feeder, and means for varying the velocity reference signal for said first vibratory feeder dependent upon the magnitude of said product velocity signal.

11. A vibratory feeder system as set forth in claim 10 wherein said means for providing said product weight signal includes circuit means for providing a first signal having a value dependent upon the magnitude of said drive current, means for providing a second signal having a magnitude representative of the impact load resulting from product impacting on said second tray as it is discharged from said first tray, and means for providing said product weight signal so as to have a value in dependence upon the magnitude of said first signal as reduced by the magnitude of said second signal.

12. A vibratory feeder system as set forth in claim 10 wherein said means for providing said product weight signal includes means for providing a first signal having a value in dependence upon the magnitude of said drive current, means for providing a second signal having a magnitude dependent upon said velocity signal for said second vibratory feeder and means responsive to said first and second signals for providing said product weight signal so as to exhibit a magnitude dependent upon the magnitude of said first signal as reduced by the magnitude of said second signal.

13. A vibratory feeder system as set forth in claim 10 wherein said product weight signal providing means includes means for providing a first signal having a magnitude dependent upon the magnitude of said drive current, means for providing a second signal having a magnitude representative of the impact load of product impacting upon said second tray as it is discharged from said first tray, means for providing a third signal having a magnitude dependent upon the value of said velocity signal for said second vibratory feeder, and summing circuit means for providing said product weight signal so as to exhibit a magnitude dependent upon the magnitude of said first signal as reduced by the magnitude of said second signal and said third signal.

14. A vibratory feeder system as set forth in claim 10 including means for providing a control signal having a magnitude dependent upon the magnitude of the product of the magnitudes of said product weight signal and said product velocity signal, said means for varying the velocity reference signal for said first vibratory feeder including circuit means responsive to said control signal for varying the velocity reference signal for said first vibratory feeder.

15. A vibratory feeder system as set forth in claim 14 including means for providing a reference control signal having a magnitude representative of a desired value of said control signal, and said circuit means responsive to said control signal comprising means for providing an error signal having a magnitude dependent upon any difference between the magnitude of said reference control signal and said control signal.

16. A vibratory feeder system comprising:
first and second vibratory feeders arranged in tandem and each including a tray with the tray of said first feeder serving as a feed tray and being arranged to receive product from a supply source to be conveyed along said feed tray and then discharged therefrom into said second tray, serving as a weigh tray, for receiving and conveying product along said weigh tray and then discharging product therefrom;
first and second driver units for respectively imparting reciprocal vibratory motion to said feed tray and to said weigh tray to convey product, each said driver unit including electromagnetic driver means coupled to its associated tray for imparting drive forces thereto to achieve tray velocity;
first and second driver control means for controlling said first and second driver units, each said driver control means including circuit means for applying drive current to its associated driver means to provide said drive forces in proportion to the magnitude of said drive current and means for providing a tray velocity signal having a magnitude dependent on said tray velocity and means for varying the magnitude of said drive current in dependence upon any difference between said velocity signal and a velocity reference signal to thereby adjust the tray velocity signal; and,
product density control means coupled to said first and second driver control means to obtain constant discharge of product weight per unit time from said weigh tray and including means for providing a product weight signal representative of the weight of product in said weigh tray as a function of the magnitude of the drive current applied to said second driver means; and means for varying the velocity reference signal for said first vibratory feeder dependent upon the value of said product weight signal.

17. A vibratory feeder system comprising:
a feeder tray for receiving product to be conveyed along and then discharged therefrom;
means for imparting reciprocal vibratory motion to said tray to convey product including electromagnetic driver means coupled to said tray for imparting drive force thereto to achieve tray velocity and driver control means including circuit means for applying drive current to said driver means to provide said drive force in proportion to the magnitude to said current, means for maintaining said tray velocity constant including means for adjusting the magnitude of said drive current;
means for providing a product weight signal, representative of the weight of product in said tray, as a function of the magnitude of said drive current;
controllable product supply means for supplying product to said feed tray at a controllable product flow rate; and,
circuit means responsive to said product weight signal for controlling said product supply means to vary the flow of product into said feed tray, whereby both the tray velocity and the product weight are held substantially constant so as to achieve substantially constant discharge of product in weight per unit time.

* * * * *

UNITED STATES PATENT OFFICE
CERTIFICATE OF CORRECTION

Patent No. 4,002,270     Dated January 11, 1977

Inventor(s) Robert Leopold Reiner

It is certified that error appears in the above-identified patent and that said Letters Patent are hereby corrected as shown below:

Column 14, line 36 change "weight" to --weigh--.

Signed and Sealed this

Twelfth Day of April 1977

[SEAL]

Attest:

RUTH C. MASON
Attesting Officer

C. MARSHALL DANN
Commissioner of Patents and Trademarks